Sept. 18, 1956 S. D. RUSSELL 2,763,203
BALE VENTILATING MEANS
Filed Sept. 29, 1950 2 Sheets-Sheet 1
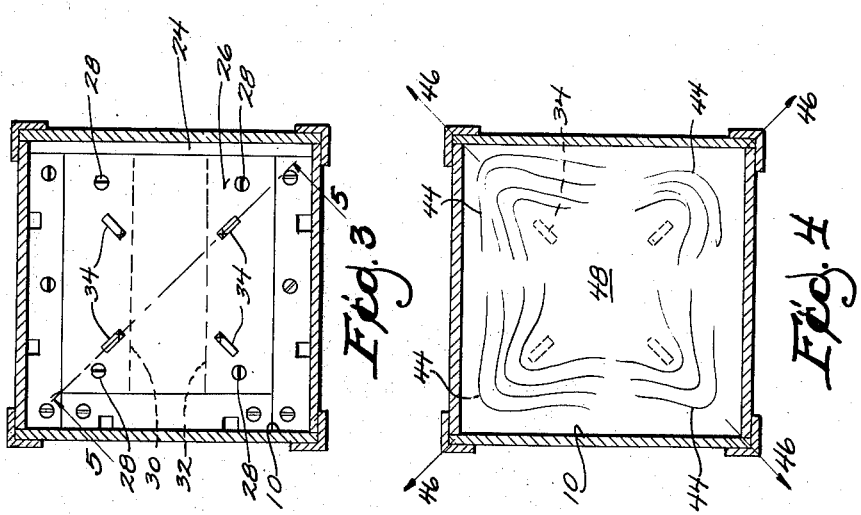
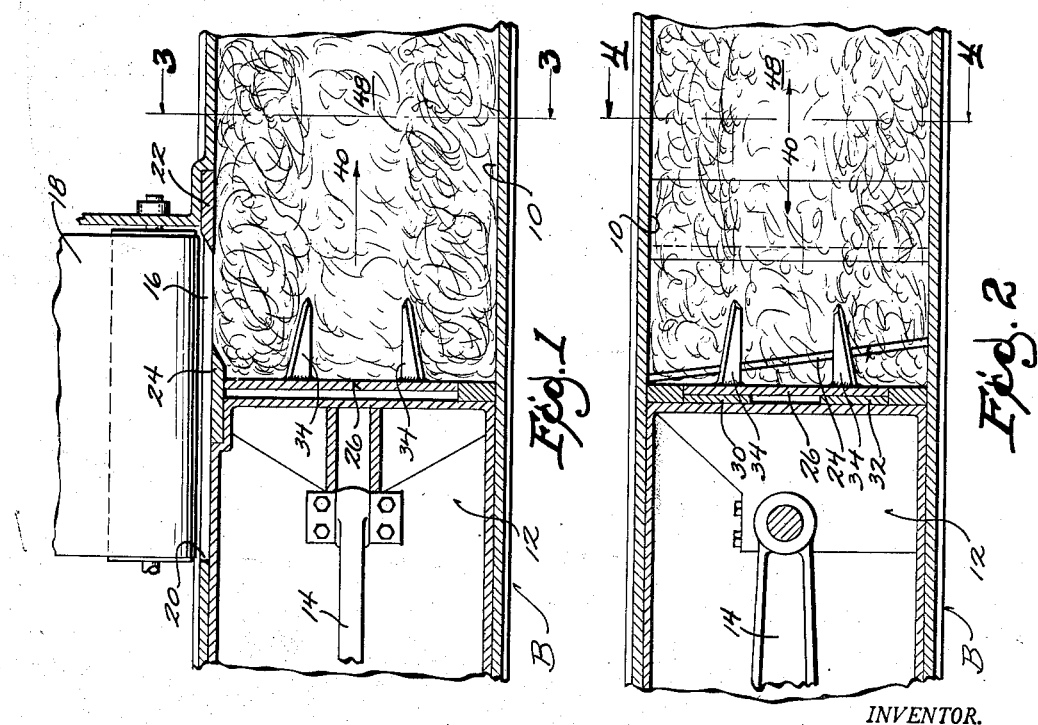
INVENTOR.
STANLEY D. RUSSELL
BY
AGENT.

Sept. 18, 1956     S. D. RUSSELL     2,763,203
BALE VENTILATING MEANS
Filed Sept. 29, 1950     2 Sheets-Sheet 2
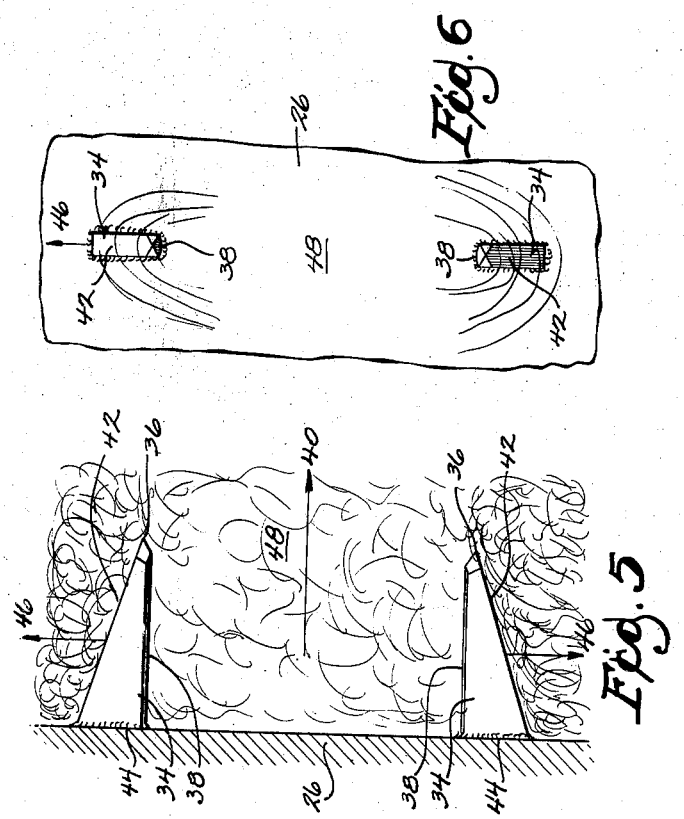
INVENTOR.
STANLEY D. RUSSELL
BY
AGENT.

United States Patent Office 2,763,203
Patented Sept. 18, 1956

2,763,203

BALE VENTILATING MEANS

Stanley D. Russell, Racine, Wis., assignor to J. I. Case Company, Racine, Wis., a corporation of Wisconsin Application September 29, 1950, Serial No. 187,390

2 Claims. (Cl. 100—98)

This invention relates to a baler and especially to the type used in baling hay or other forage crops.

Specifically this invention relates to a means of ventilating the bale so as to accelerate the curing process in storage.

When baling forage crops such as hay, weather conditions often prevent the baling of the crop at the time when the material has the proper moisture content. Frequently the crop may have reached the ideal condition for baling only to be rained upon, or often the urgency of other tasks prevents baling at the proper time. Anticipation of such contingencies often forces the farmer to bale hay or forage prematurely, with the result that the bales are stored before they are cured. Hay or forage, baled before sufficient curing has taken place, may spoil by molding. The reason for spoilage is the lack of a sufficient quantity of air reaching the interior of the bale, to carry off the moisture before the molding takes place. If internal ventilation of the bale is provided, the excess moisture will be dissipated promptly and proper curing will be the result. This invention is intended to properly ventilate the crop in the process of baling, thus preparing it for subsequent curing in storage.

An object of this invention is to provide a means of ventilating the interior of a bale in the process of baling.

Another object is to provide means whereby the central portion or core of the bale is substantially of less density than the outer marginal portion, thus allowing the air to "breathe" through the bale in a more thorough manner than if the ventilation was limited to the mere piercing of relatively small holes.

Further objects and advantages of the invention will become apparent from a consideration of the following detailed description taken in connection with the accompanying drawings wherein a satisfactory embodiment of the invention is shown. However, it is to be understood that the invention is not limited to the details disclosed but includes all such variations and modifications as fall within the spirit of the invention.

Referring to the drawings:

Fig. 1 is a fragmentary horizontal sectional view of a baler showing the plunger having the invention affixed thereto.

Fig. 2 is a fragmentary vertical sectional view of parts shown in Fig. 1.

Fig. 3 is a sectional view taken at 3—3 of Fig. 1.

Fig. 4 is a sectional view taken at 4—4 of Fig. 2.

Fig. 5 is an enlarged sectional view taken at 5—5 of Fig. 3, and showing the "flow" of the material being baled.

Fig. 6 is an end view of details in Fig. 5 and also shows the effect of the ventilating prongs on the fibres being baled.

When referring to the baling chamber and plunger in the description which follows, "forward" is to be interpreted as a movement of the plunger in the direction effecting a compression of the bale, and "inwardly" is to be interpreted as being in a direction toward the horizontal axis of the chamber.

Fig. 1 shows a conventional baler B having a chamber 10 in which a plunger 12 is reciprocated by a pitman 14. Chamber 10 is provided with a charging opening 16 through which the material to be baled enters. A conveyor 18 is employed in this instance to convey the hay or other material into the charging opening 16. The conveyor 18 is conventional and need not be further described. As shown in Fig. 1, the charging opening 16 extends to the point 20, and the plunger 12 is shown as having traversed the opening 16 a substantial distance.

A pair of knives 22 and 24 are employed to sever the stream of material as the latter has entered the chamber 10, providing what is known as a "sliced" bale. Knife 22 is secured to the chamber 10 and knife 24 is secured to the plunger 12, the severing of the material taking place when knives 22 and 24 engage each other. As the material is fed into the chamber 10 and the plunger 12 continues to reciprocate, the material is compacted and finally tied into bales of the conventional length. The resulting bales often contain a crop which has not had time to cure properly.

Referring to Figs. 1, 2 and 3, the plunger 12 is provided with a bale ventilator plate 26, which is securely bolted to the plunger by bolts 28 as shown in Fig. 3. A pair of spacer boards 30, 32 serve to bring the bale ventilator plate 26 flush with the surrounding plunger frame.

A plurality of ventilating prongs 34, four in this instance, are welded or otherwise secured to the ventilator plate 26, in the positions shown in Figs. 1 to 4. Prongs 34 are of rectangular cross-section in this instance and of the shape shown, the extreme points 36 being beveled to assure durability and more elapsed time before sharpening is required.

An important feature of this invention is the shape of the ventilating prongs 34. Reference to Fig. 5 will make clear the means of satisfying the objects of the invention.

Each of prongs 34 is provided with an inner face 38. In this instance faces 38 are mutually parallel to the direction of travel 40 of plunger 12. It will be seen that faces 38 will have no shifting effect upon the material being baled in a direction normal to the direction of plunger travel indicated by the arrow 40.

Prongs 34 are provided with forwardly and inwardly directed faces 42 which terminate in the forwardly directed points 36. It is clear that when the plunger 26 travels to the right or in the direction of the arrow 40 of Figs. 1 and 5, the face of plunger 26 tends to compact the material in the direction of the arrow 40, which material is composed of substantially long stems entwined together in a matted mass. When the material is being compressed it is simultaneously engaged by the faces 42 of prongs 34, with the result that the stems passing over the faces 42 are compelled to move up the latter and consequently are drawn outwardly from the core of the bale in the direction 46 and which is indicated at 47 of Fig. 6. When the stems are drawn outwardly from the core the latter becomes of less density as indicated at 48 of Fig. 4 thus allowing air to circulate freely through the core and effect thorough curing of the baled material.

It has been found that molding takes place where the material is too dense to allow the air to circulate therethrough. Obviously the core of the bale is the most likely point for molding to take place and by making a bale of less density through the core, a bale is obtained which will cure rapidly in storage and not be liable to spoilage by molding. The outer margin of the bale will cure properly owing to the fact that this portion has interstices that allow access to the air a sufficient distance inwardly to effect proper curing of the crop. The prongs 34 leave additional ventilating opening approximately of the shape of their cross section.

It will be readily understood that this invention will result in producing bales having a center core portion that will permit air to circulate and thus hasten the proper curing of the bale and prevent molding of the crop.

The above being a complete description of an illustrative embodiment of the invention, what is claimed as new and desired to be secured by Letters Patent of the United States is:

1. In a baler having a horizontal baling chamber and a plunger mounted for reciprocal movement therein, said plunger having a pressing surface normal to the axis of reciprocation, a bale ventilating means comprising a plate secured to said plunger, four ventilating prongs perpendicularly secured to the plate in positions to define a rectangle surrounding the said axis, the cross-sectional form of each of said prongs being substantially that of a rectangle one of the sides of which is curved, the said curved side constituting the inner face of a prong and being perpendicular to the surface of the plunger, the outer or opposite face of each prong being planar and inclined forwardly from the said surface so as to converge toward the axis of said plunger and intersect the said inner face.

2. In a baler having a baling chamber and a plunger mounted for reciprocal movement therein, said plunger having a pressing surface thereon normal to the axis of reciprocation, a bale ventilating means comprising a plurality of ventilating prongs perpendicularly secured on said surface in positions defining a polygon surrounding said axis and terminating in extreme points, the cross-sectional form of each of said ventilating prongs parallel to said surface being substantially polygonal, the mutually opposed inner faces of said ventilating prongs being parallel to said axis of reciprocation, and said ventilating prongs being provided with outer faces opposed to said inner faces converging from said pressing surface toward said extreme points.

References Cited in the file of this patent

UNITED STATES PATENTS

| | | |
|---|---|---|
| 659,612 | Webb | Oct. 9, 1900 |
| 797,997 | Webb | Aug. 22, 1905 |
| 970,930 | Kingham | Sept. 20, 1910 |
| 1,045,125 | Dain | Nov. 26, 1912 |
| 2,413,522 | Russell | Dec. 31, 1946 |

FOREIGN PATENTS

| | | |
|---|---|---|
| 551,908 | France | Jan. 15, 1923 |